CROSSPOINT SELECTOR FOR REED RELAY MATRIX

Filed July 2, 1965

United States Patent Office 3,519,752

Patented July 7, 1970

3,519,752

CROSSPOINT SELECTOR FOR REED RELAY MATRIX

Hans Schober, Hofpfad, Germany, assignor to International Standard Electric Corporation, a corporation of Delaware Filed July 2, 1965, Ser. No. 469,084
Claims priority, application Germany, July 18, 1964, 1,210.049
Int. Cl. H04q 3/00
U.S. Cl. 179—18 6 Claims

ABSTRACT OF THE DISCLOSURE

A guidewire network includes a plurality of cascaded switching stages using glass reed relay crosspoints. Associated with each stage is a checking relay which scans the crosspoints in a selected multiple. When the checking relay finds an idle crosspoint, it is selected.

Figure 1:
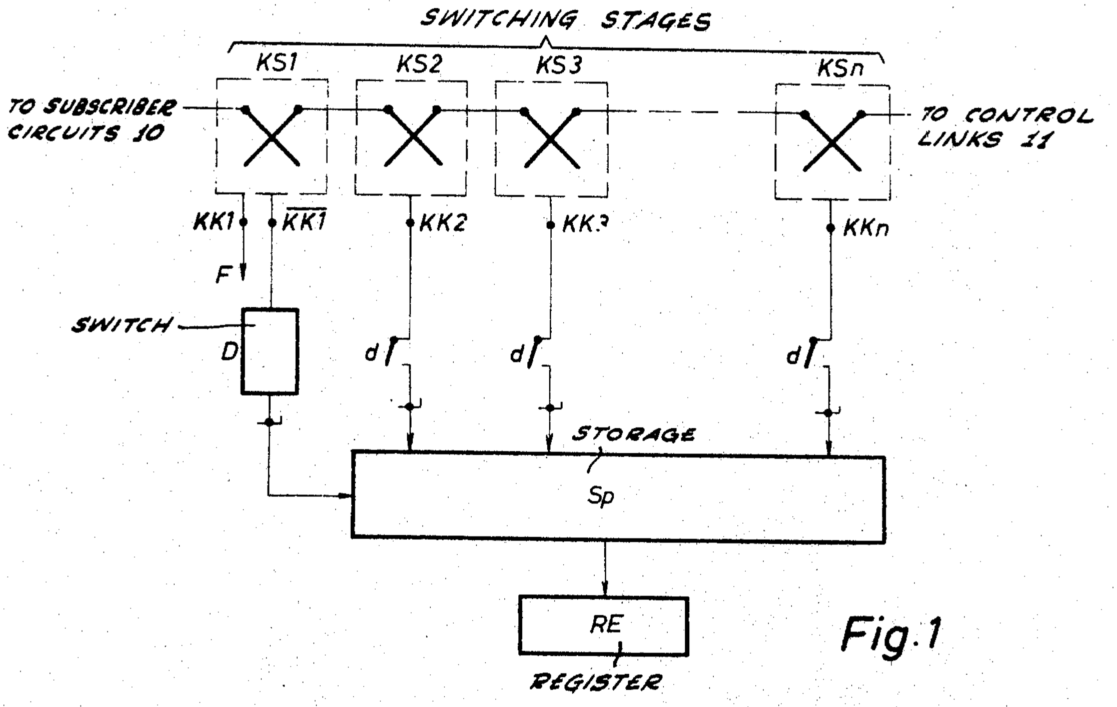

This invention relates to circuit for supervising the through-connection in multi-stage switching grids of an exchange system.

The problem of supervising the establishment of a connection has become more important since the introduction of centrally controlled exchange systems. These systems are mostly constructed as multi-stage switching grids. When the through-connecting elements are set by a central marker or by a marker associated to each stage, the central control element must be released after each control process. Otherwise, the operation in such a group is impaired or even comes to a standstill.

Therefore, it is impossible for such exchange systems to supervise and signal via the control element when a fault occurs during the establishment of a connection.

An object of the invention is to provide means for supervising the through-connection in multi-stage switching grids. In particular, an object is to provide such supervision when the grids use a central control element for supervision.

A further object is to avoid delaying the release of said control element when a fault occurs. Thus, an object is to maintain the function of the central control element with reference to the establishment of a connection despite any crosspoint failures.

Yet another object is to use the central control element to identify a fault.

The circuit for supervising through-connections in multi-stage switching grids is characterized by a check on switching carried out in each switching stage. Depending on the test result in the switching stage that has just been set, the central control facility is released. The switching condition of all switching check facilities is, therefore, evaluated as it is set and before the central control is released.

Thus, the switching check in one switching stage is made over the partially established route leading to that one stage. When the final switching stage furnishes a "no through-connection" signal the switching conditions are evaluated for the checking facilties of all switching stages. The location of the fault is then identified so that the crosspoints, participating in establishing the connection, are investigated.

Moreover, supervision of through-connections via a multi-stage switching grid is improved. Prior to the through-connection of a crosspoint in a switching stage, the release of the crosspoint is checked. Thus, a new connection can only use a released crosspoint.

A circuit arrangement for carrying out the invention has a particular advantage in multi-stage switching grids using guide wire controls. The holding circuits of the crosspoints themselves can be checked by a suitable test facility. Since connections may have been established within a switching stage, the invention provides that only the crosspoints within a switching stage that are reachable through the selected input can be connected with the checking facility. The holding circuits of all crosspoints, reachable from one input, can be controlled through the contacts of the central control element. According to a further embodiment of the invention, the through-connecting potential can be connected to the connecting point for the switching check facility for the selected crosspoint.

When a relay is provided as a checking facility, the pre-checking circuit can identify the available condition or the faulty condition prior to a through-connecton. The check is dependent on the potential of the holding circuit through-connection of the selected and actuated crosspoint. Moreover, rechecking is accomplished using this check relay, after through-connection, depending upon the potential of the holding circuit. The through-connection or "no through-connection" of the crosspoint is determined. Prior to applying the through-connecting potential, the crosspoint check relay should not respond. After the removal of a through-connecting potential, the check relay must respond when there is a faulty through-connecting process within the switching stage. During application of the through-connecting potential, the responding circuit of the crosspoint check relay is blocked to avoid an erroneous and premature through-connection indication.

Figure 2:
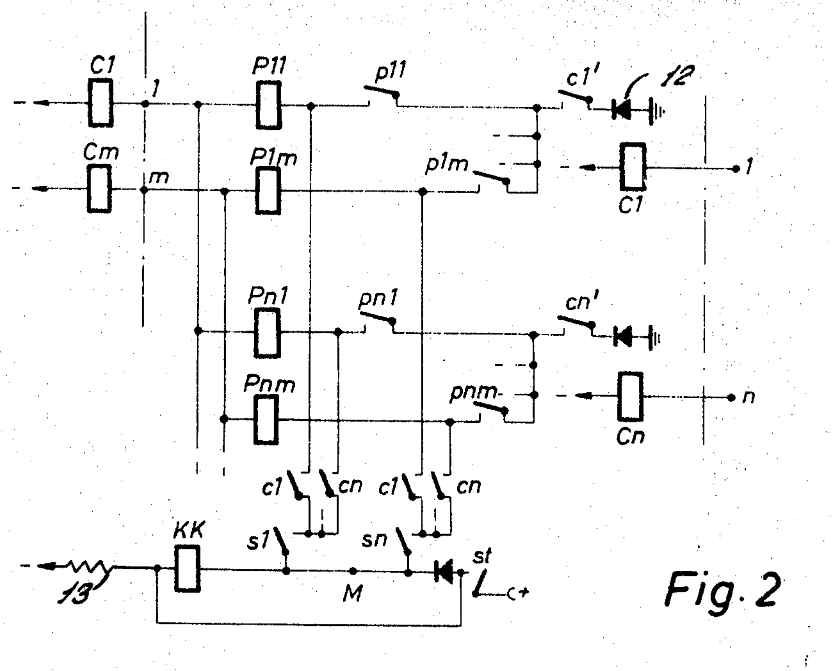

The above mentioned and other features of this invention and the manner of obtaining them will become more apparent, and the invention itself will be best understood by reference to the following description of an embodiment of the invention taken in conjunction with the accompanying drawings, in which:

FIG. 1 is a functional block diagram of a multi-stage switching grid of an exchange system with facilites for supervising the through-connection; and FIG. 2 is a schematic circuit diagram at a single crosspoint checking facility of a switching stage, equipped with guide wires.

Briefly, a central control circuit makes any suitable test of each stage and selects an idle input to that stage. For example, if input 1 (right-hand side of FIG. 1) is idle, the central control may apply a potential there and operate relay C1, which closes all of its contacts *c*1, *c*1'. A scanner closes contacts *s*1 . . . *sn*, in order, and ground feeds through any busy crosspoints to operate the relay KK. Thus, if crosspoint P11 is assumed to be busy by way of example, a circuit is completed from ground through diode 12, contacts *c*1', *p*11, *c*1, *s*1, relay KK, and resistor 13 to battery. The central control steps on to the contacts *s*2 and tries the next marked crosspoint. Since the central control selected input 1, one of the contacts *s*1 . . . *sn* should find an unmarked contact *c*1, and relay KK fails to operate; whereupon, that crosspoint is selected.

In greater detail,

FIG. 1 schematically shows the switching stages KS1, KS2, KS3 . . . KS*n* of a multi-stage switching grid. For example, in a telephone exchange system, such a switching grid can connect the subscriber circuits with the connecting links.

The subscriber circuits 10 are connected at the inputs of the switching stages KS1. The links 11 are connected at the outputs of the switching stage KS. A central control element controls the through-connection of a multi-stage switching grid. The central control element also selects a defined output of the switching stage KS*n* for a defined input of the switching stage KS1 marked by the calling subscriber. The connection is established from this output by means of through-connecting a crosspoint in each switching stage.

Each switching stage has a crosspoint checking facility. The output signals of these stages appear at the terminals $\overline{KK1}$, KK1, KK2, KK3, KK*n*. The switching stages are set stage by stage, commencing with the final switching stage KS*n* and advancing toward first switching stage KS1. The crosspoint checking in any one stage is made over the established partial route of the total connection. At the crosspoint checking in the last set switching stage KS1, a signal is obtained after it has been sent over a completed path through the entire switching grid.

When through-connection is properly carried out in all switching stages, the check facility of the switching stage KS1 responds. The output KK1 bears a signal which causes the release (F) of the central control element. However, if the switching stage KS1 is unsuccessful in its through-connection test, the checking device does not respond. The output $\overline{KK1}$ then conducts a signal, via the switch D and a storage S*p*, which causes a registering device RE to evaluate the switching condition of all crosspoint check facilities KK*n*, KK3, KK2. The storage device S*p* takes over the signals of the output KK2 to KK*n* to determine the location of a fault. If, for example, the switching stage KS3 has not through-connected, it is a fault indicated by a missing signal at the output KK3.

The storage device S*p* furnishes fault identification information to a registering facility RE. For example, a printing device may record the fault. Parallel to this process, the control information items applied by the central control grid, are also analyzed so that the crosspoints participating in the connection can be investigated.

FIG. 2 shows an example of a crosspoint check facility which is constructed according to the teachings of the invention and which could be located in any of the stages KS1, KS2, KS3 . . . KS*n*. This figure shows only the particular circuits, of any one single switching stage, which are important for the checking. The switching stage of a grid has inputs 1 to *n*. To each input is connected a seizing relay C1 to C*n*. The input is selected via a guide wire network extending from the preceding switching stage via the selected final facility and the central control element of the switching grid.

If an input is seized, the seizing relay responds, e.g. the relay C1 responds when the input 1 is seized. Through the contacts *c*1, this relay applies a ground potential for the holding circuits of the crosspoint elements P11 to P1*m*. This holding circuit extends to all the crosspoints which can connect the input 1 with one of the outputs 1 to *m*. Since this input is marked as available in the central control element, the holding circuit contacts *p*11 to *p*1*m* should not be closed. As is indicated by contacts *c*1 to *cn*, all holding circuits of the crosspoints leading to the same output are connected, via a selecting contact *s*1 to *sn* of the central control element, with a crosspoint check relay KK. Since all contacts *p*11 to *p*1*m* are open because of a previously proper release, the check relay KK cannot respond. Thus, a check is made, prior to through-connection of the selected crosspoint, to determine whether the previous release was properly made.

No holding circuit (*p*11 to *p*1*m*) should be closed prior to the through-connection of a crosspoint. Otherwise, several outputs can be connected via the following selection from the central control element. If, for example, the crosspoint P11 has not yet released, the input 1 of the switching stage is already connected with the output 1 before the actual selecting process.

For example, when the central control element selects the crosspoint P1*m* for through-connection, the connection between the input 1 and the output *m* is provided. According to the invention, this can be recognized and suitably checked by the crosspoint checking facility.

When the check relay KK responds prior to the application of the through-connected potential at contact *st*, the selected input has been previously connected to an output. The through-connection of another crosspoint can be prevented via the central control element. Since other non-related connections already exist via the switching stage, care must be taken to be certain that the crosspoint checking remains limited only to that portion of the switching stage which is concerned for the connection to be established. If, for example, a previously established connection already exists via the crosspoint P*nm* between the input *n* and the output *m*, the central control element prevents a selection of this output *m* for the presently extending through-connections. This occupied crosspoint condition is indicated through contact *sn*.

Therefore, when a new connection to be established from input 1, it must be limited to the outputs 1 to *m*–1. This limitation is taken over by the central control element because the selecting step contact *sn* is closed to indicate that a crosspoint is being seized and operated in this particular stage. The crosspoints P1*m* to P*nm* cannot be actuated at this time because output *m* is now busy. If the output 1 has been selected for the desired connection, the contact *s*1 is closed in the central control element.

The check relay KK checks, whether all holding circuits of the crosspoints P11 to P*n*1, which can be through-connected to said output, have released. If this is not the case, the check relay KK responds via any one of the still closed *p*11 . . . *pn*1-contact and marks the connection as not yet released. In this case, through-connection of the selected crosspoint P11 can be prevented, and contact *st* does not apply a through-connecting potential. If all crosspoints P11 to P*n*1 have released, the check relay KK is not energized.

Through-connection is initiated. The crosspoint P11 is excited and the connection is established. When applying the through-connecting potential, the check relay is blocked so that the through-connection is not prematurely reported. When contact *p*11 has closed, the check relay KK is energized when the control contact *st* opens. Thus, the check relay indicates that the through-connection is completed. During through-connection the input 1 of the following switching stage is already selected. In that switching stage, the same processes are repeated.

The drawing does not show how the central control element is informed, via the guide wires of the switching grid, which of the advancing outputs is available. Nor does it show a so-called offering potential. This kind of control is unimportant for the crosspoint checking. There are also other circuit arrangements which are based on the method for supervising the through-connection in multi-stage switching grids according to the invention.

While the principles of the invention have been described above in connection with specific methods, apparatus and applications, it is to be understood that this description is made only by way of example and not as a limitation on the scope of the invention.

I claim:

1. A circuit for supervising the through-connection of switching systems having multi-stages of crosspoint grids which are set under the control of a common control circuit, said grids being switched through successively in inverse order whereby the grid of the final stage is switched through first, and the grid of the primary stage is switched last, said supervisory circuitry comprising test means at each of said stages for testing the crosspoints at that stage for open or closed conditions, means for actuating each of said test means responsive to the switching through of the preceding grid thereby testing each of said stages over that portion of the partially established switched path which has been set up to the stage under test, means responsive to the test result at each stage for switching a crosspoint path through that stage, means for retesting the crosspoints at the stage under test after switch through for open or closed condition, means for determining the switch condition of all crosspoints in said path after the switch through of said paths, and means responsive to the switched through condition of the last stage in said path for releasing said common control circuit.

2. The system of claim 1 and means whereby said crosspoints are held via a holding circuit, and wherein said test means for conducting the checking of crosspoints at each of said crosspoint grids includes said holding circuit.

3. The system of claim 2 and means for selecting an input to said network, and means for extending said test means from only those crosspoints which can be reached from said selected input to said test means.

4. A switching system having multi-stages of crosspoint grids which are set under the control of a common control circuit, said switching system comprising test means in each of said stages for checking the crosspoint at that stage for open or closed conditions, said test means comprising a relay which is controlled via a crosspoint holding circuit prior to switch through for identifying faulty ones of said crosspoints, means responsive to the test results at each stage for setting a switch path through that stage, means responsive to the switch through of the last stage in said path for releasing said common control circuit, and means for determining the switching condition of all crosspoints in said path.

5. The system of claim 4 and means via a holding circuit for said crosspoints for controlling said relay after said switch-through.

6. The system of claim 5 and means for blocking said checking circuit during switch-through of said crosspoints.

References Cited

UNITED STATES PATENTS

| | | | |
|---|---|---|---|
| 3,238,306 | 3/1966 | Bohlmeijer. | |
| 3,349,189 | 10/1967 | Van Bosse. | |
| 3,351,721 | 11/1967 | Voegtlen et al. | 179—175.21 |
| 3,347,994 | 10/1967 | Schluter. | |
| 3,414,678 | 12/1968 | Hackenberg. | |

KATHLEEN H. CLAFFY, Primary Examiner

W. A. HELVESTINE, Assistant Examiner